May 22, 1962 R. H. JOHNSON 3,035,439
HYPERSONIC WIND TUNNEL TEST SECTION
Filed Sept. 25, 1958
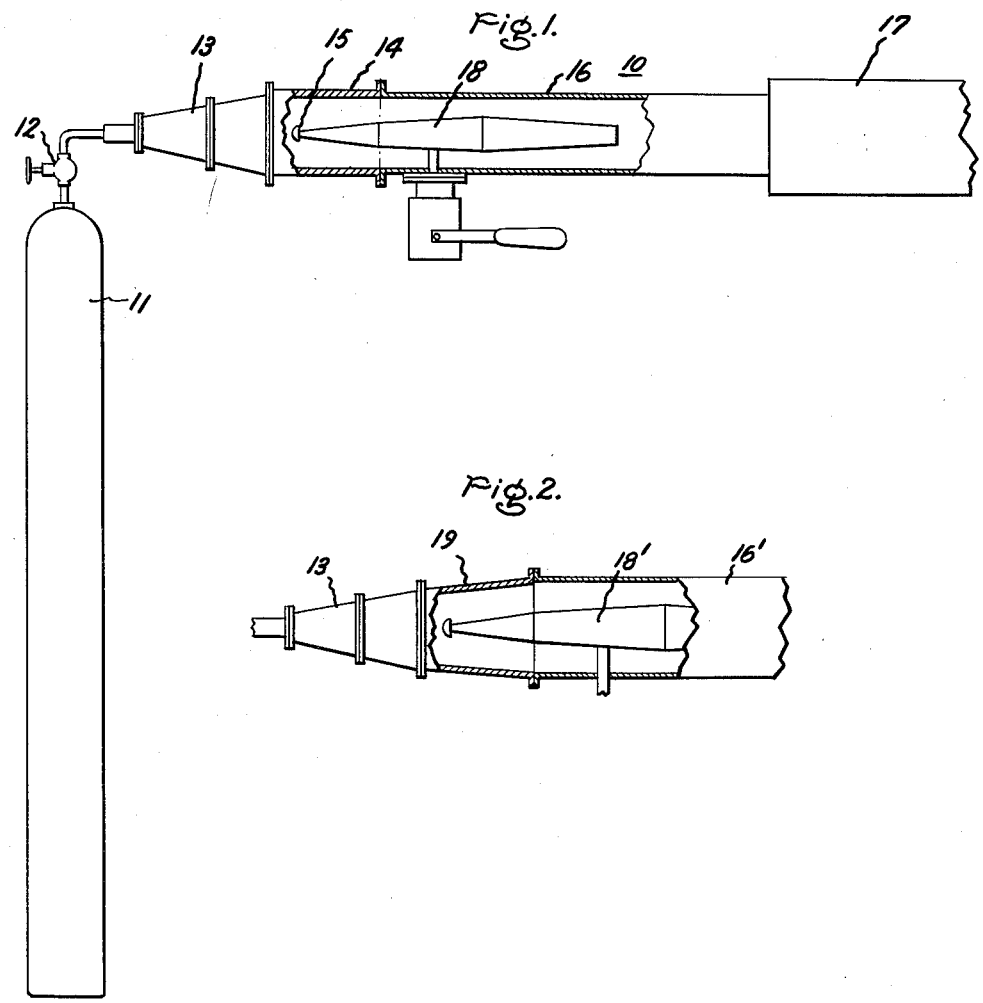
Inventor:
Robert H. Johnson,
by Joseph T. Cohen
His Attorney.

United States Patent Office 3,035,439
Patented May 22, 1962

3,035,439
HYPERSONIC WIND TUNNEL TEST SECTION
Robert H. Johnson, Schenectady, N.Y., assignor to General Electric Company, a corporation of New York
Filed Sept. 25, 1958, Ser. No. 763,260
3 Claims. (Cl. 73—147)

This invention relates to test sections for hypersonic wind tunnels and related fluid flow apparatus, and more particularly, to an improved test section for the control of shock waves in such hypersonic wind tunnels for increased efficiency and range of operation.

The study of basic aerodynamic phenomena at very high Mach numbers has progressed beyond mere academic interest with increased importance being attached to speeds far in excess of speed of sound, and with particular application not only to high Mach numbers within the earth's atmosphere, but also to vehicles or missiles which must enter and leave the earth's atmosphere at Mach numbers which cause prohibitively high temperature conditions. An important tool employed in the study of high Mach number conditions is a wind tunnel, or additionally, a wind tunnel where high Mach number conditions in the earth's atmosphere may be simulated to attain required data. Such wind tunnels, hypersonic or supersonic tunnels for high Mach numbers, may employ as the fluid medium various gases such as nitrogen, helium, or air. To provide the simulated conditions, at which required data at very high Mach numbers may be obtained, presents various problems, not only those economic in nature relating to the physical equipment and fluids or gases employed, but also those relating to various occurrences in the tunnel at the very high Mach numbers, including more particularly the strong shock waves from the test models which reflect from the walls of the tunnel, and thereby affect various flow conditions in the test section. These reflected waves not only affect the tunnel flow and data obtained therefrom, but also affect and limit range of operation of the tunnel and size of the test model.

Accordingly, it is an object of this invention to provide an improved test section for hypersonic wind tunnels.

It is a further object of this invention to increase the Mach number of the fluid through a tunnel by the use of an improved test section.

It is still another object of this invention to control reflecting shock waves in a test section by an improved test section configuration.

It is another object of this invention to improve the overall efficiency of a hypersonic tunnel.

This invention will be better understood when taken in connection with the following description and drawings, in which:

FIG. 1 is a schematic illustration of a hypersonic wind tunnel; and

FIG. 2 is an illustration of the improved test sections to be employed in FIG. 1.

This invention will be better understood with a reference description of the overall tunnel and a particular description of the test section of this invention as utilized in the tunnel.

Referring now to FIG. 1, there is shown a general blow down type tunnel arrangement 10 which includes a pressure vessel 11 containing the particular gaseous flow medium utilized, under pressure. A suitable valve mechanism and control arrangement 12 permits expansion of the gas from the pressure vessel 11 through a nozzle 13. From the nozzle 13 the high velocity gas is passed through a test section 14 which includes mounted therein a particular model 15 to be studied under the flow conditions. The following cylindrical section 16 is employed together with appropriately shaped control bodies as a diffuser section which conducts the high velocity fluid flow of a vacuum section. The vacuum section may be either an evacuated chamber or in a preferred form of this invention, a suitable pumping mechanism 17 for establishing a reduced pressure level. In the exemplary tunnel of this invention, the pressure vessel 11 contains helium under a pressure ranging to about 5,000 p.s.i. The helium is discharged through a simple conical nozzle 13 of a 10 to 20 degree included angle, and approximately 3 feet in length. From the nozzle 13 the high velocity helium enters test section 14, connected to nozzle 13, of from 3 to 6 inches in diameter and 10 inches in length. The following diffuser section, connected to the nozzle 13, is about 3 feet in length, and all connections provide a continuous tunnel. In order to provide vacuum conditions for the discharger of the high velocity helium, a rotary vacuum pump system 17 is employed.

The operation of the tunnel, especially an ultra-high Mach number tunnel, depends on the overall compression ratio of the power plant, i.e., ratio of stagnation or total pressure to pressure at the end of the diffuser. Pressure in the test section decreases very rapidly with increasing Mach number. Very large pressure ratios for high Mach number operation must be provided by the pressure rise through the diffuser and the overall pumping machinery rise. In the tunnel of the present invention, where the pumping machinery comprises high pressure vessel 11 and vacuum pumps 17, a cone cylinder central body 18 is employed within diffuser section 16 to maintain a proper throat area and area ratio. Body 18 accordingly provides the pressure rise necessary to maintain minimum inlet pressure to pumps 17 and to prevent flow separation from the walls of nozzle 13. The tunnel, using helium, has provided Mach numbers in excess of 28. However, when a large model 15 is placed in the test section, flow conditions deteriorated from "choking" in the tunnel, a condition occurring when a shock wave develops standing in the diverging portion of the nozzle instead of appearing as a shock wave system downstream. Causes of this condition include feedback through the boundary layer of the tunnel and progressive flow separation from the walls of the tunnel. Choking, with the adverse effects, including limiting the size of models has been effectively eliminated in high velocity tunnels by the use of an improved test section configuration.

Referring now to FIG. 2, there is illustrated one preferred form of this invention as a tapered test section 19 having an internal diameter progressively increasing from the nozzle end to the diffuser end. Test section 19 is mounted directly to the nozzle and to a corresponding larger diffuser section 16' with a larger central body 18'.

A further method of assembly where the nozzle is sectional, as illustrated, includes removal of the last section of the nozzle, together with the test section, and substituting a tapered test section. This method permits use of the original diameter diffuser section.

Good results have also been obtained by a tapered test section in the form of a sleeve which may be inserted in the test section of FIG. 1 to blend with the nozzle 16. Discontinuities in the test section sleeve at the nozzle and downstream end presented no adverse effects. An example of such a sleeve employed in a 6 inch tunnel with a 10° nozzle, tapered from about 3.5 inches diameter at the nozzle end to about 5 inches at the diffuser end of the test section.

The particular degree of taper may vary over a wide range depending for example on Mach numbers attained, nozzle angle and tunnel diameter, etc. In high Mach number tunnels the boundary layer on the walls of the nozzle and test section not only becomes thicker with the higher velocities but also tapers from a beginning in the nozzle to thicknesses greater than one inch downstream.

This boundary layer represents a region of low kinetic energy and shock waves striking this region provide pressure differentials such that a feedback flow is generated, or flow in the boundary layer is directed upstream with deleterious effects on tunnel flow and flow separation. Such tapering contributes to a reduction of the free flow area of the tunnel. Accordingly, one preferred and desirable taper design is a taper equal to the taper of the boundary layer at a given Mach number such that pressure differentials are relieved and a continuous flow diameter maintained. Broadly speaking, however, the taper becomes a preferred compromise over a range of Mach numbers and boundary layer thickness for generalized tunnel operation.

The shock waves emanating from the nozzle and model are essentially conical, and reflect from the walls of the tapered test section in the form of weakened shock waves. This condition together with the tapered walls presenting a continuous negative pressure gradient through the test section minimizes and impedes feed-back through the boundary layer. In addition to increasing the performance and operating range of the tunnel, the resulting larger downstream cross-section of the test section permits larger models to be tested. The larger diameter central bodies that may be employed will result in a more advantageous supersonic diffuser.

Present operation of the wind tunnel described in this invention with the test section as given indicates a change in Mach number from 21.1 to 22.2 under identical pressure conditions. It was also found that the maximum diameter model size could be greatly increased.

It can thus be understood that this invention provides an improved test section for hypersonic wind tunnels which substantially increases the tunnel performance without an increased work input to the tunnel, and that the operation of the tunnel is thereby extended. The tapered test section improves the performance of the tunnel by exercising some control over shock waves from a model body. The tapering test section should also be understood as not limited in application to wind tunnels, but in general to any supersonic passage in which the shock waves are reflected from the walls and where the resulting upstream feedback through the boundary layers would be detrimental to the aerodynamic performance of the device.

While other modifications of this invention and variations of apparatus which may be employed within the scope of the invention have not been described, the invention is intended to included all such as may be embraced within the following claims.

What I claim as new and desire to secure by Letters Patent of the United States is:

1. A hypersonic wind tunnel including a source of high pressure fluid, an expanding tapered nozzle to expand said fluid, a test section connected to said nozzle for the testing of models therein, a diffuser section connected to said test section, and a low pressure section connected to said diffuser section, so that all said sections provide a continuous tunnel, said test section being characterized by having an internal expanding conical taper from the inlet to the outlet less than the taper of said nozzle whereby an increase in fluid velocity is attained in said test section.

2. A hypersonic wind tunnel including a source of high pressure fluid, an expanding tapered nozzle to expand said fluid, a test section connected to said nozzle for the testing of models therein, a diffuser section connected to said test section, and a low pressure section connected to said diffuser section, so that all said sections provide an internal smooth and continuous tunnel for said fluid, said test section being characterized by having an internal conical expanding taper from the inlet to the outlet thereof of approximate diameters of about 3.5 to 5 whereby an increase in fluid velocity is attained in said test section.

3. In a hypersonic wind tunnel containing a plurality of sections to provide a continuous tunnel, and where said sections include a tapered expanding nozzle section to expand a fluid, a test section connected to said nozzle section for the testing of models therein, a diffuser section connected to said test section, and a low pressure section connected to said diffuser section, an improved test section therefor comprising, a tapered section characterized by having an internal taper tapering from a smaller to a larger opening from the inlet to the outlet thereof, the said taper substantially corresponding to the taper of boundary layers present in a non-tapered test section in said tunnel under similar operating conditions, said taper being different from the taper of said nozzle section.

References Cited in the file of this patent

UNITED STATES PATENTS

| | | |
|---|---|---|
| 2,240,119 | Montgomery et al. | Apr. 29, 1941 |
| 2,570,129 | Johnson | Oct. 2, 1951 |
| 2,696,110 | Eggers | Dec. 7, 1954 |
| 2,836,063 | Yoler et al. | May 27, 1958 |
| 2,892,308 | Ferri et al. | June 30, 1959 |